United States Patent
Nishimaki et al.

(10) Patent No.: US 9,311,754 B2
(45) Date of Patent: *Apr. 12, 2016

(54) IMAGE PROCESSING DEVICE, IMAGE PROCESSING METHOD, AND IMAGE PROCESSING SYSTEM

(71) Applicants: Sony Computer Entertainment Inc., Tokyo (JP); SONY CORPORATION, Tokyo (JP)

(72) Inventors: Yoichi Nishimaki, Kanagawa (JP); Yoshinori Ohashi, Tokyo (JP)

(73) Assignees: SONY CORPORATION, Tokyo (JP); SONY COMPUTER ENTERTAINMENT, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,870

(22) Filed: Jul. 21, 2015

(65) Prior Publication Data

US 2015/0325053 A1 Nov. 12, 2015

Related U.S. Application Data

(63) Continuation of application No. 14/542,921, filed on Nov. 17, 2014, now Pat. No. 9,123,158, which is a continuation of application No. 13/798,519, filed on Mar. 13, 2013, now Pat. No. 8,912,980.

(30) Foreign Application Priority Data

Jun. 29, 2012 (JP) .................................. 2012-147342

(51) Int. Cl.
*G09G 5/00* (2006.01)
*G06T 19/00* (2011.01)
(Continued)

(52) U.S. Cl.
CPC ............ *G06T 19/006* (2013.01); *A63F 13/213* (2014.09); *A63F 13/428* (2014.09);
(Continued)

(58) Field of Classification Search
None
See application file for complete search history.

(56) References Cited

U.S. PATENT DOCUMENTS

2009/0262113 A1 10/2009 Kotake et al.
2010/0091096 A1 4/2010 Oikawa et al.

FOREIGN PATENT DOCUMENTS

CN 101669146 3/2010
CN 101548547 B 10/2011
(Continued)

OTHER PUBLICATIONS

Notification of Reasons for Refusal dated Feb. 4, 2014 from corresponding Japanese Application No. 2012-147342.
(Continued)

*Primary Examiner* — Muhammad N Edun
(74) *Attorney, Agent, or Firm* — Katten Muchin Rosenman LLP

(57) ABSTRACT

An image acquisition unit acquires an image captured by a first imaging device provided in a HMD for presenting an image observed when a three-dimensional image in a virtual three-dimensional space is projected onto a real-world setting, the first imaging device being configured to visualize an area including a field of view of a user wearing the HMD. A marker detection unit detects a marker included in the image captured by the first imaging device and acquired by the image acquisition unit. The image acquisition unit acquires an image captured by a second imaging device having an angle of view that at least partially overlaps an angle of view of the first imaging device. If the marker is not captured in the image captured by the first imaging device, the marker detection unit detects the marker in an image captured by the second imaging device.

8 Claims, 8 Drawing Sheets

(51) Int. Cl.
- *G06K 7/14* (2006.01)
- *G09G 5/02* (2006.01)
- *G06F 3/0481* (2013.01)
- *G06F 3/0484* (2013.01)
- *G06K 9/00* (2006.01)
- *G06F 3/01* (2006.01)
- *G06T 7/00* (2006.01)
- *G02B 27/00* (2006.01)
- *A63F 13/428* (2014.01)
- *A63F 13/213* (2014.01)
- *G02B 27/01* (2006.01)
- *A63F 13/833* (2014.01)

(52) U.S. Cl.
CPC ............ *G02B27/0093* (2013.01); *G06F 3/012* (2013.01); *G06F 3/04815* (2013.01); *G06F 3/04845* (2013.01); *G06K 7/1404* (2013.01); *G06K 9/00523* (2013.01); *G06K 9/00671* (2013.01); *G06T 7/0042* (2013.01); *G09G 5/02* (2013.01); *A63F 13/833* (2014.09); *G02B 27/017* (2013.01); *G02B 2027/014* (2013.01); *G02B 2027/0123* (2013.01); *G02B 2027/0138* (2013.01); *G02B 2027/0178* (2013.01); *G06T 2200/04* (2013.01); *G06T 2207/10012* (2013.01); *G06T 2207/10028* (2013.01); *G06T 2207/30204* (2013.01); *G06T 2215/16* (2013.01)

(56) References Cited

FOREIGN PATENT DOCUMENTS

| | | |
|---|---|---|
| CN | 102306158 | 1/2012 |
| EP | 0 0899 690 | 3/1993 |
| JP | 11-136706 | 5/1999 |
| JP | 2011-242591 | 12/2011 |
| WO | 2012/086188 | 6/2012 |

OTHER PUBLICATIONS

Chinese First Office Action dated Apr. 28, 2015 from corresponding Application No. 201310149276.1.
U.S. Office Action dated Dec. 18, 2014 from corresponding U.S. Appl. No. 14/542,921.

IMAGE PROCESSING DEVICE, IMAGE PROCESSING METHOD, AND IMAGE PROCESSING SYSTEM

BACKGROUND OF THE INVENTION

1. Field of the Invention

The present invention relates to an image processing device, an image processing method, and an image processing system.

2. Description of the Related Art

Recently, technologies for presenting stereoscopic images have been advanced, and head mounted displays (hereinafter, "HMD") capable of presenting stereoscopic images having depth have been available to the public. As one variation of HMDs, optical see-through HMD capable of presenting stereoscopic images to the user by using a holographic device or a half mirror and allowing the user to see through the HMD have been developed.

Meanwhile, augmented reality (AR) technologies capable of generating an image in which, for example, computer graphic images are superimposed on real world images captured by an imaging device such as a camera, and partially modifying real world images presented to the user accordingly have become close to practical use. AR technology may involve detecting identifiable information such as a bar code (hereinafter, referred to as "marker") and generating an image linked to the information.

By mounting an imaging device on an optical see-through HMD, the marker captured in the field of view of the user can be imaged. An AR image linked to the marker can be generated and presented on the HMD. One disadvantage with the imaging device mounted on an optical see-through HMD is that its angle of view changes in association with the movement of the user's head. Therefore, the marker may not enter the field of view of the imaging device when, for example, the user holds the marker and moves the marker accordingly. Accordingly, precise identification of the position of the marker is called for.

SUMMARY OF THE INVENTION

The present invention addresses the aforementioned disadvantage and a purpose thereof is to provide a technology capable of improving the precision of identifying the position of information for which the position is identifiable.

One embodiment of the present invention that addresses the aforementioned disadvantage relates to an image processing device. The device comprises: an image acquisition unit configured to acquire an image captured by a first imaging device provided in an optical head-mounted display (HMD) for presenting an augmented real-world image observed when a three-dimensional image in a virtual three-dimensional space is projected onto a real world settings, the first imaging device being configured to visualize an area including a field of view of a user wearing the HMD; and a marker detection unit configured to detect a marker included in the image captured by the first imaging device and acquired by the image acquisition unit. The image acquisition unit also acquires an image captured by a second imaging device having an angle of view that at least partially overlaps an angle of view of the first imaging device, and, if the marker is not captured in the image captured by the first imaging device, the marker detection unit detects the marker in an image captured by the second imaging device.

Another embodiment of the present invention relates to an image processing method. The method comprises: acquiring, using a processor, an image captured by a first imaging device provided in an optical head-mounted display (HMD) for presenting an augmented real-world image observed when a three-dimensional image in a virtual three-dimensional space is projected onto a real-world setting, the first imaging device being configured to visualize an area including a field of view of a user wearing the HMD; acquiring, using a processor, an image captured by a second imaging device having an angle of view that at least partially overlaps an angle of view of the first imaging device; and detecting, using a processor, a marker included in at least one of the image captured by the first imaging device and the image captured by the second imaging device.

Still another embodiment of the present invention relates to an image processing system. The system comprises: an optical head-mounted display (HMD) for presenting an augmented real-world image observed when a three-dimensional image in a virtual three-dimensional space is projected onto a real world setting; a first imaging device provided in the HMD and configured to image a subject in an area including a field of view of a user wearing the HMD; a second imaging device having an angle of view that at least partially overlaps an angle of view of the first imaging device; and an image generation unit configured to use, as a marker, a subject captured by at least one of the first imaging device and the second imaging device to generate an augmented reality image for presentation on the HMD.

Yet another embodiment of the present invention relates to a computer program that causes a computer to perform the steps of the above method.

The program may be provided as part of the firmware built in the device for basic control of the hardware resources such as video and audio decoders. The firmware is stored in a semiconductor memory such as a read only memory or a flash memory inside the device. For the purpose of providing the firmware or updating part of the firmware, a computer readable recording medium storing the program may be provided or the program may be transmitted over a communication circuit.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
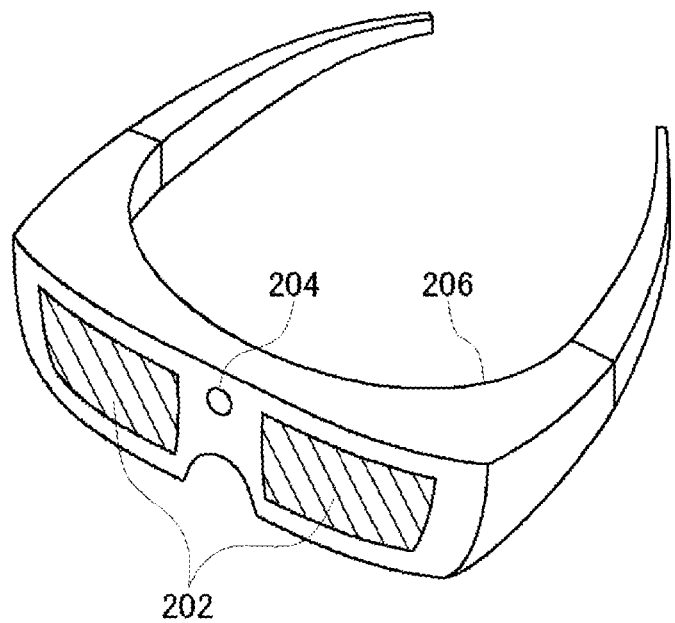
FIG. 1 schematically shows an exemplary appearance of the stereoscopic image observation device according to the embodiment.

FIG. 1 schematically shows an exemplary appearance of a stereoscopic image observation device 200 according to an embodiment of the present invention. The stereoscopic image observation device 200 includes a presentation unit 202 for presenting a stereoscopic image, a first imaging device 204, and a housing 206 accommodating various modules. The stereoscopic image observation device 200 is provided with an earphone for outputting sound.

The presentation unit 202 includes an optical see-through head mounted display (HMD) for presenting a stereoscopic image to the eyes of a user and a liquid crystal shutter for changing the transmittance for external light transmitted through the optical see-through HMD. The first imaging device 204 images a subject located in an area including the field of view of the user wearing the stereoscopic image observation device 200. Therefore, the first imaging device 204 is located between eyebrows of the user when the user wears the stereoscopic image observation device 200. For example, the first imaging device 204 is implemented by using solid-state image sensing device such as a charge coupled device (CCD) image sensor or a complementary metal oxide semiconductor (COMS) image sensor.

The housing 206 serves as a frame of the stereoscopic image observation device 200 with the shape of eyeglasses and houses various modules (not shown) used in the stereoscopic image observation device 200. The modules used in the stereoscopic image observation device 200 include an optical engine including a hologram light guide plate implementing the optical see-through HMD, a driver and a synchronous signal receiver unit for driving the liquid crystal shutter, a communication module such as a Wi-Fi (registered trademark) module, an electronic compass, an acceleration sensor, a tilt sensor, a global positioning system (GPS) sensor, a 3rd. Generation (3G) module, an illumination intensity sensor, etc. These modules are exemplary. There is no need to mount the entirety of these modules on the stereoscopic image observation device 200. The module mounted on the device may be determined depending on the situation in which the stereoscopic image observation device 200 is used.

FIG. 1 shows an example of the stereoscopic image observation device 200 with the shape of eyeglasses. Alternatively, the stereoscopic image observation device 200 may have any of a variety of shapes including the shapes of a hat, a belt wrapped around and fixed to the user's head, a helmet covering the entirety of the user's head, etc. A skilled person would readily understand that the stereoscopic image observation device 200 of any shape will be encompassed by the embodiment.

Figure 2:
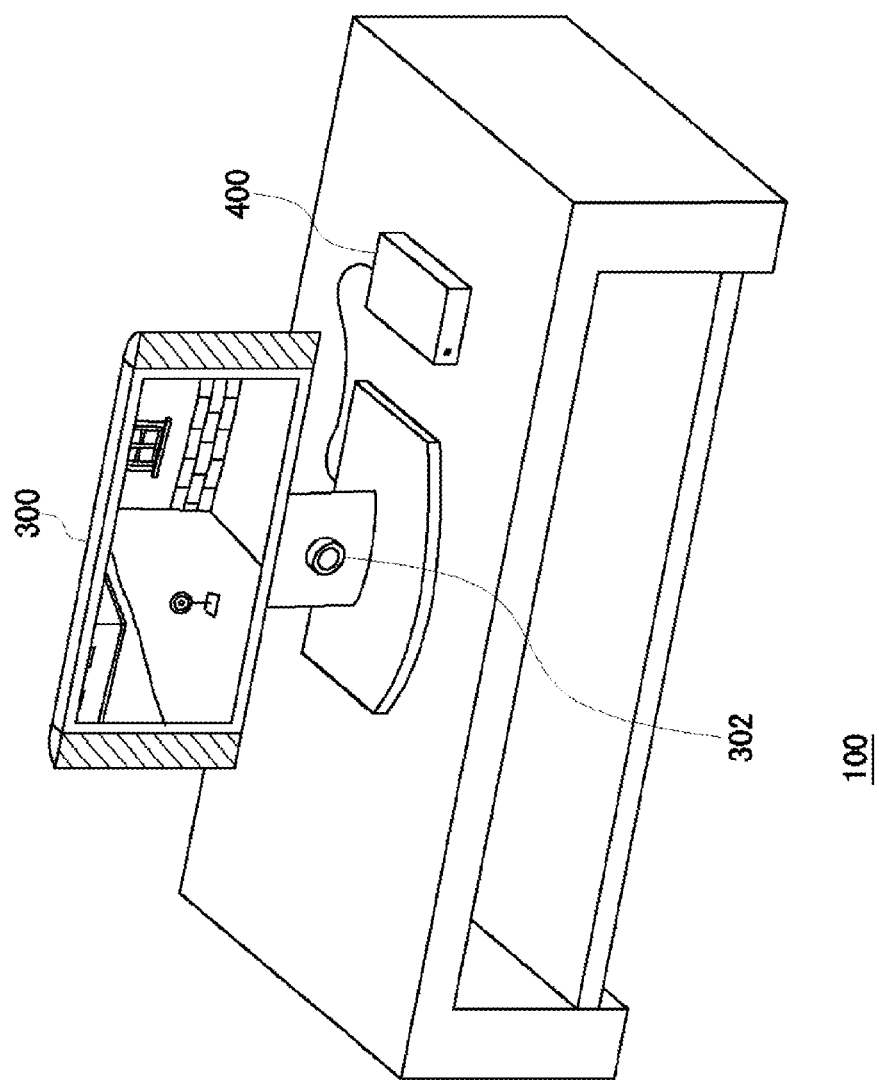
FIG. 2 schematically shows the entirety of an image presentation system according to the embodiment.
Figure 2:
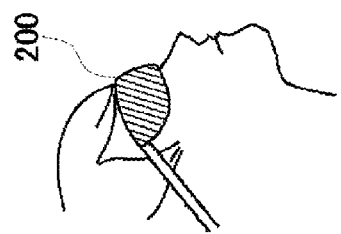

FIG. 2 schematically shows the entirety of an image presentation system 100 according to the embodiment. The image presentation system 100 according to the embodiment includes the stereoscopic image observation device 200, a monitor 300, a second imaging device 302, and an information processing device 400.

The monitor 300 plays back at least a part of the content on a screen. The monitor 300 can be implemented by an ordinary television set. Preferably, the monitor 300 is a three-dimensional monitor capable of displaying stereoscopic images according to the frame sequential method. Hereinafter, it will be assumed that the monitor 300 is a three-dimensional monitor. A three-dimensional monitor is also provided with the function of an ordinary television monitor for displaying two-dimensional images.

Since human eyes are spaced apart by about 6 cm, parallax is produced between an image viewed from the left eye and an image viewed from the right eye. Human brain is said to use parallax images perceived by the left and right eyes as information to recognize the depth of an object. For this reason, by projecting a parallax image perceived by the left eye and a parallax image perceived by the right eye to the respective eyes, an image having a depth is perceived by one. The monitor 300 alternately presents the left-eye parallax image and the right-eye parallax image using time-division multiplexing. The monitor 300 can be implemented by a known presentation device such as a liquid crystal television, a plasma television, an organic EL monitor, etc.

The second imaging device 302 is provided at the center of the frontal face of the monitor 300 and captures an image of an object located in the direction facing the monitor. The second imaging device 302 may be built in the monitor 300 or installed in front of the monitor 300. Details of the second imaging device 302 will be given later.

The stereoscopic image observation device 200 is an optical see-through HMD. As mentioned above, the stereoscopic image observation device 200 is provided with an optical shutter (not shown) for observing the monitor 300. Switching of parallax images on the monitor 300 is synchronized with the opening and closing of left and right shutters of the optical shutter. More specifically, while the monitor 300 is displaying a parallax image for the left eye, the shutter for the right eye is closed and the shutter for the left eye is opened so as to present the parallax image for the left eye to the user wearing the stereoscopic image observation device 200. Conversely, while the monitor 300 is displaying a parallax image for the right eye, the shutter for the left eye is closed and the shutter for the right eye is opened so as to present the parallax image for the right eye to the user. The optical shutter is implemented by, for example, a known liquid crystal shutter.

Switching of parallax images on the monitor 300 is synchronized with the opening and closing of left and right shutters of the liquid crystal shutter 210. More specifically, while the monitor 300 is displaying a parallax image for the left eye, the shutter for the right eye is closed and the shutter for the left eye is opened so as to present the parallax image for the left eye to the user wearing the stereoscopic image observation device 200. Conversely, while the monitor 300 is displaying a parallax image for the right eye, the shutter for the left eye is closed and the shutter for the right eye is opened so as to present the parallax image for the right eye to the user.

The stereoscopic image observation device 200 receives a synchronization signal for switching the shutter. The synchronization signal is wirelessly transmitted from a signal transmitter (not shown) provided in the monitor 300 or the information processing device 400 by using, for example, infrared light.

The information processing device 400 acquires a stereoscopic image for presentation on the image presentation system 100 and the aforementioned synchronization signal. By way of example, the information processing device 400 is a desktop game device, a mobile game device, etc. The information processing device 400 uses a built-in processor to generate a stereoscopic image and a synchronization signal, or acquires a stereoscopic image from another information processing device such as a server via a network interface (not shown).

Figure 3:
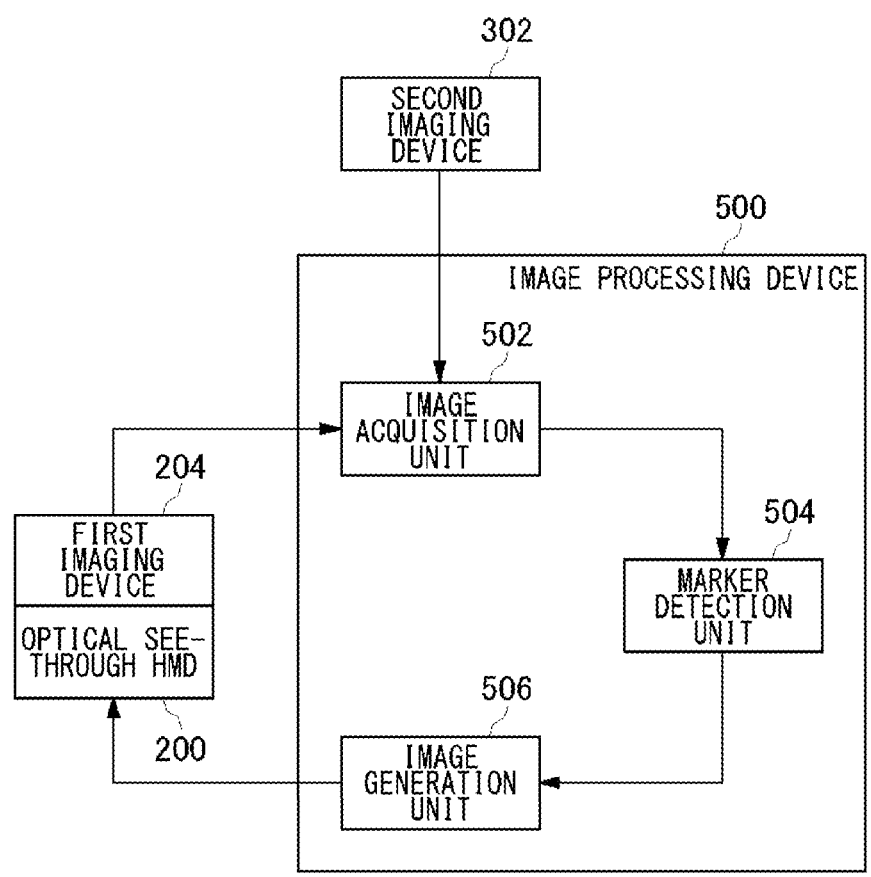
FIG. 3 schematically shows the internal structure of an image processing device according to the embodiment.

FIG. 3 schematically shows the internal structure of an image processing device 500 according to the embodiment. The image processing device 500 according to the embodiment is implemented as part of the aforementioned information processing device 400. Alternatively, the image processing device 500 may be implemented in a server for generating a stereoscopic image that should be transmitted to the information processing device 400 via a network such as the Internet, or built in the stereoscopic image observation device 200 or the monitor 300. Still alternatively, the image processing device 500 may be an independent device. Hereinafter, it is assumed that the image processing device 500 according to the embodiment is implemented as part of the aforementioned information processing device 400.

An image acquisition unit 502 acquires an image captured by the first imaging device 204 for capturing an image of an area including the field of view of the user wearing the stereoscopic image observation device 200. A marker detection unit 504 detects a marker included in the image captured by the first imaging device 204 and acquired by the image acquisition unit 502. An image generation unit 506 generates an AR image that should be presented on the optical see-through HMD of the stereoscopic image observation device 200, linking the AR image to the marker detected by the marker detection unit 504. The image generation unit 506 transmits the generated AR image to the stereoscopic image observation device 200, and the optical see-through HMD displays the AR image.

The term "marker" indicates information used by the image generation unit 506 and identifies the position and orientation of an image generated in a virtual three-dimensional space. The term "AR image" indicates an image generated by the image generation unit 506 as being linked to, for example, a marker, and indicates an image the position and orientation of which change in accordance with a change in the position and orientation of the marker.

Figure 4:
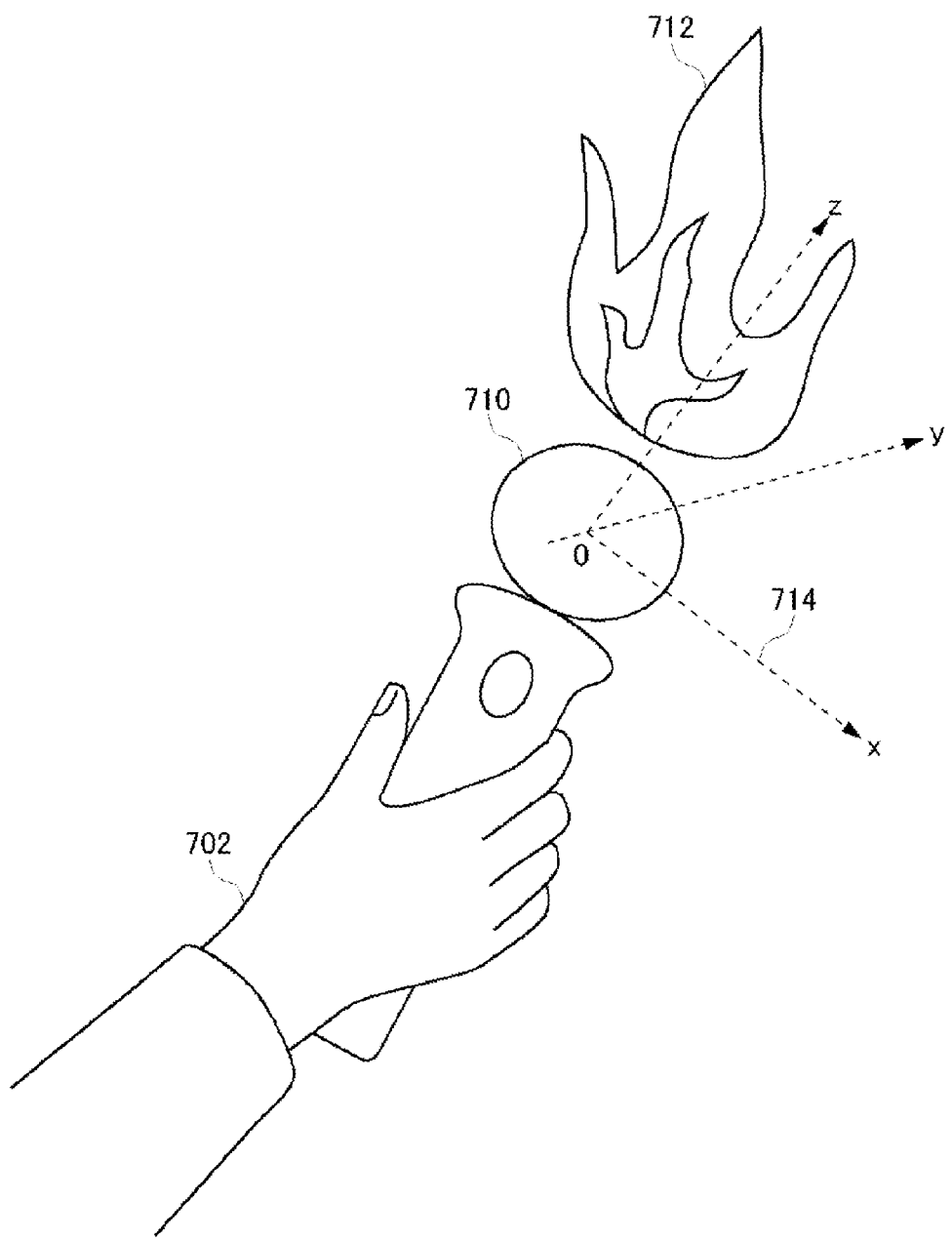
FIG. 4 shows examples of a marker and an AR image according to the embodiment.

FIG. 4 shows examples of a marker and an AR image according to the embodiment. FIG. 4 shows an exemplary marker composed of a rod-shaped grip held by an arm 702 of the user and of a spherical object. In the example shown in FIG. 4, the marker 710 is a real object. The first imaging device 204 takes a follow shot of the marker 710 located in an area including the field of view of the user and transmits the resultant image to the image acquisition unit 502. The marker detection unit 504 identifies the position and orientation of the marker 710 by referring to the image acquired by the image acquisition unit 502. The image generation unit 506 generates an AR image 712 at a corresponding position in a virtual three-dimensional space, mapping the marker 710 to the image 712. In the example shown in FIG. 4, the AR image 712 is an object representing flame.

The image generation unit 506 generates the AR image 712 in accordance with a coordinate system 714 in which the position of the marker 710 mapped to the AR image 712 is defined as the origin. For this reason, as the user changes the position and orientation of the marker 710, the coordinate system 714 in accordance of which the AR image 712 is generated is also changed. As the coordinate system 714 is changed, the position and orientation of the AR image 712 are also changed accordingly. The origin of the coordinate system 714 in accordance with which the AR image 712 is generated need not necessarily be aligned with the associated marker. In either case, the marker and the AR image generated as being linked to the marker are located at different positional coordinates in the three-dimensional space. This may create a situation in which the user's line of sight is not leveled at the marker 710 and the marker 710 is outside the angle of view of the first imaging device 204, but the AR image 712 associated with the marker 710 remains in the display area of the optical see-through HMD of the stereoscopic image observation device 200.

Figure 5B:
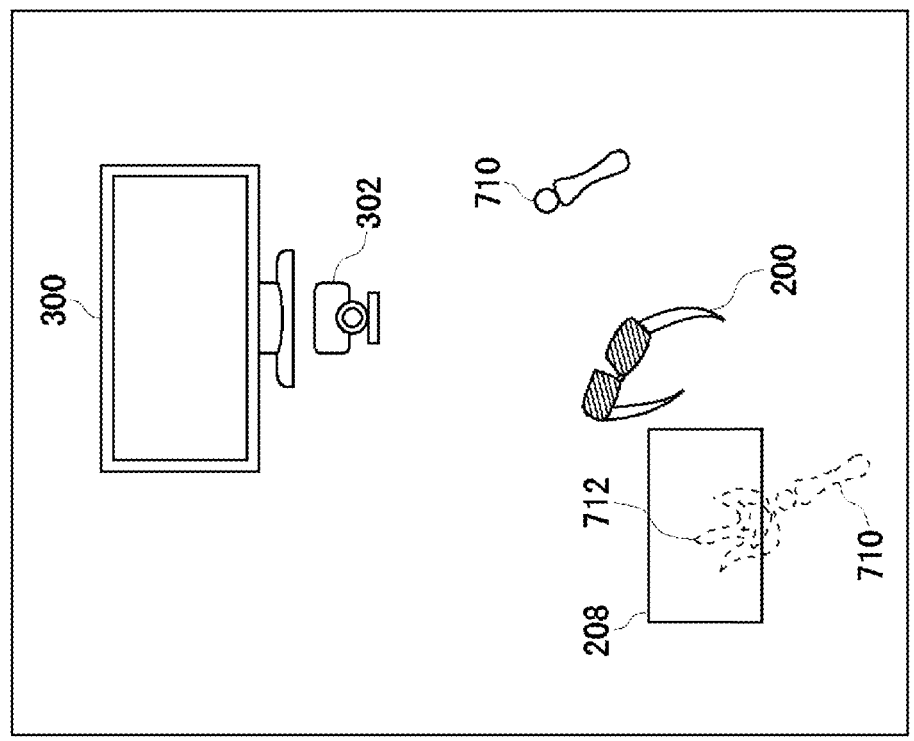
FIGS. 5A-5B show the relative positions of the angle of view of the first imaging device and the marker, and an image of the optical see-through HMD occurring concurrently.
Figure 5A:
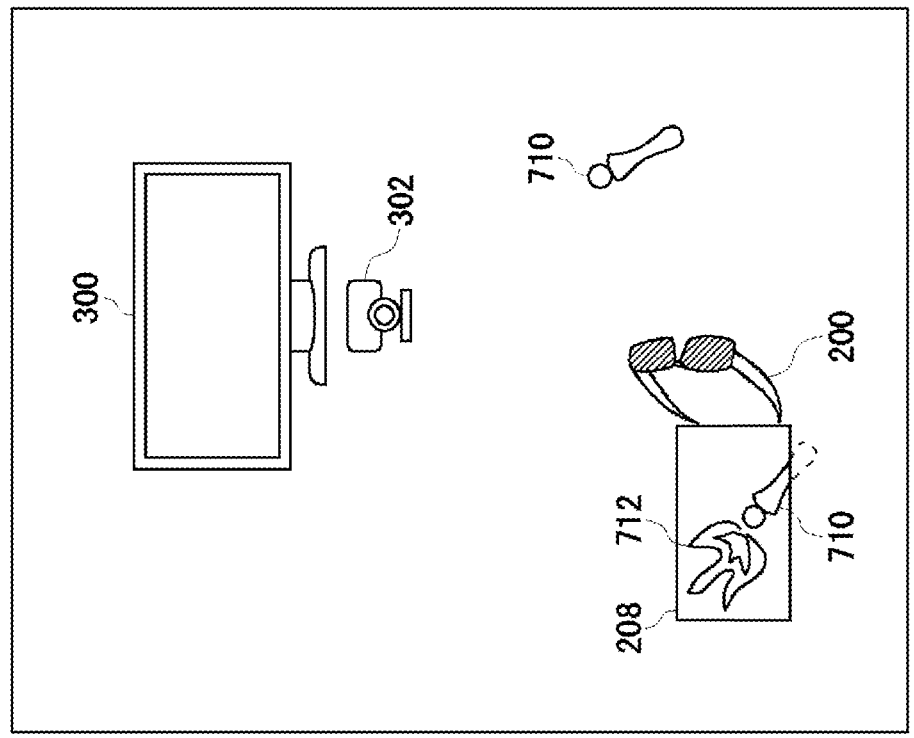

FIGS. 5A-5B show the relative positions of the angle of view of the first imaging device 204 and the marker 710, and an image 208 of the optical see-through HMD occurring concurrently.

FIG. 5A shows a case in which the marker 710 is included in the angle of view of the first imaging device 204. Since the marker 710 is included in the angle of view of the first imaging device 204, the marker detection unit 504 is capable of detecting the marker 710 in the image acquired by the image acquisition unit 502. Therefore, the marker 710 imaged by the first imaging device 204 and the AR image 712 generated by the image generation unit 506 and linked to the marker 710 are shown in the image 208 on the optical see-through HMD.

FIG. 5B shows a case in which the marker 710 is outside the angle of view of the first imaging device 204. Since the marker 710 is not included in the angle of view of the first imaging device 204, the marker detection unit 504 is not capable of detecting the marker 710 in the image acquired by the image acquisition unit 502. FIG. 5B shows the AR image 712 and the marker 710 to which the AR image 712 is linked in broken lines in the image 208 on the optical see-through HMD. Since the marker detection unit 504 is not capable of detecting the marker 710, the image generation unit 506 is not capable of generating the AR image 712 so that the AR image 712 is not shown in the image 208 on the optical see-through HMD.

As the user's line of sight, i.e. the imaging direction of the first imaging device 204 is moved from the position shown in FIG. 5A to the position shown in FIG. 5B, the marker 710 will be outside the angle of view of the first imaging device 204 in this process. This will cause the AR image 712 to disappear from the image 208 on the optical see-through HMD in eyes of the user. As a result, the user may feel stressed. The stress can be relieved by using the image generation unit 506 or the marker detection unit 504 to estimate the position of the marker 710 even after the marker 710 goes outside the angle of view of the first imaging device 204, and causing the image generation unit 506 to generate the AR image 712 by referring to the estimated position. This may, however, lower the prevision of the position in which the AR image 712 should be generated.

Accordingly, the image acquisition unit 502 also acquires the image captured by the second imaging device 302 having an angle of view that at least partially overlaps the angle of view of the first imaging device 204. The marker detection unit 504 detects a marker included in at least one of the image captured by the first imaging device 204 and the image captured by the second imaging device 302. More specifically, the marker detection unit 504 detects a marker in the image captured by the second imaging device 302 if a marker is not captured in the image captured by the first imaging device 204.

In the example shown in FIGS. 5A-5B, the second imaging device 302 is provided in front of the monitor 300. As in the case of the example shown in FIG. 5B, even if the marker 710 is outside the angle of view of the first imaging device 204, the marker detection unit 504 is capable of detecting the marker 710 so long as the marker 710 is included in the angle of view of second imaging device 302. This allows the image generation unit 506 to display the AR image 712 or a part thereof in the image 208 on the optical see-through HMD.

Figure 6:
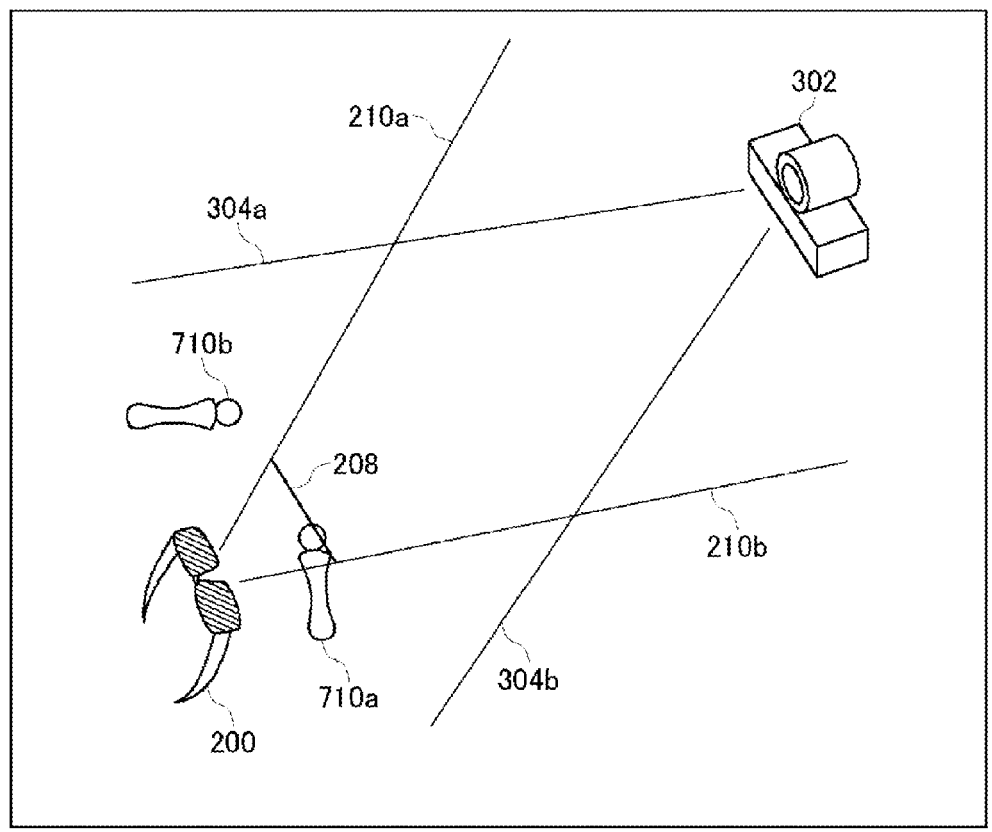
FIG. 6 shows an exemplary relationship between the angle of view of the first imaging device and the angle of view of the second imaging device.

FIG. 6 shows an exemplary relationship between the angle of view of the first imaging device 204 and the angle of view of the second imaging device 302. Referring to FIG. 6, the area sandwiched by two lines indicated by a symbol 210a and a symbol 210b represents the angle of view of the first imaging device 204. The area sandwiched by two lines indicated by a symbol 304a and a symbol 304b represents the angle of view of the second imaging device 302. The line represented by a symbol 208 in FIG. 6 represents the area in which the image 208 is presented on the optical see-through HMD.

FIG. 6 shows two markers including a first marker 710a and a second marker 710b. At least the spherical object of the first marker 710a is included in the angle of view of the first imaging device 204 and the angle of view of the second imaging device 302. Meanwhile, the second marker 710b is not included in the angle of view of the first imaging device 204 and is only included in the angle of view of the second imaging device 302.

If the AR image generated by the image generation unit 506 as being linked to the second marker 710b is included in the image 208 on the optical see-through HMD, the image generation unit 506 generates the AR image by referring to the position of the second marker 710b detected by the marker detection unit 504 in the image captured by the second imaging device 302.

In contrast, the first marker 710a is included both in the angle of view of the first imaging device 204 and the angle of view of the second imaging device 302. Therefore, the image generation unit 506 is capable of improving the precision of position of the first marker 710a by integrating the information on the first marker 710a included in the image captured by the first imaging device 204 and with the information on the first marker 710a included in the image captured by the second imaging device 302.

As described above, the first imaging device 204 is provided in the stereoscopic image observation device 200 attached to the head of the user. As the user tilts the head, the first imaging device 204 is also moved in accordance with the movement of the user's head. For this reason, the image captured by the first imaging device 204 as the user tilts the first marker 710a while maintaining his or her head untilted, and the image captured by the first imaging device 204 as the user tilts his or her head while maintaining the first marker 710a untilted would be similar. In other words, it is difficult to distinguish between whether the user is tilting his or her head, or the first marker 710a is tilted, merely by referring to the image captured by the first imaging device 204.

Meanwhile, since the second imaging device 302 is independent of the user's head, distinction between whether the user is tilting his or her head, or the first marker 710a is tilted can be made by analyzing the image capture by the second imaging device 302. Accordingly, when the marker is captured both in the image captured by the first imaging device 204 and in the image captured by the second imaging device 302, the marker detection unit 504 detects the tilt of the marker by referring to the image captured by the second imaging device 302. The image generation unit 506 generates the AR image linked to the marker, tilting the image in accordance with the tilt of the marker detected by the marker detection unit 504.

This allows the tilt of the first marker 710a to be accurately determined so that, given that the AR image linked to the first marker 710a is, for example, a bowl filled with soup, the image generation unit 506 is capable of generating an image showing the soup spilling from the bowl in accordance with the tilt of the first marker 710a.

In this way, if the marker is outside the angle of view of the first imaging device 204, the image generation unit 506 is capable of generating the AR image linked to the marker so long as the second imaging device 302 is capable of imaging the marker. In this sense, the second imaging device 302 may be located anywhere so long as the angle of view of the second imaging device 302 at least partially overlaps the angle of view of the first imaging device 204. Meanwhile, the image presentation system 100 according to the embodiment is designed to allow the user to view the image on the monitor 300 via the optical see-through HMD in the stereoscopic image observation device 200 so that at least a part of the image generated by the image generation unit 506 is displayed on the monitor 300. For this reason, the user is considered to view the monitor 300 relatively often.

Therefore, the second imaging device 302 is preferably installed to directly face the user when the user wearing the optical see-through HMD directly faces the monitor 300. More specifically, the second imaging device 302 is preferably attached or installed above or below the center of the frame of the monitor 300. This increases the likelihood that the marker held by the user is within the angle of view of the second imaging device 302.

Described above is a case in which the second imaging device 302 is located in isolation and independently of the stereoscopic image observation device 200. The second imaging device 302 may not be independent of the stereoscopic image observation device 200. For example, the image device provided in a second stereoscopic image observation device 200b worn by the second user different from the first user wearing a first stereoscopic image observation device 200a may be defined as the second imaging device. The following description concerns such a case.

Figure 7:
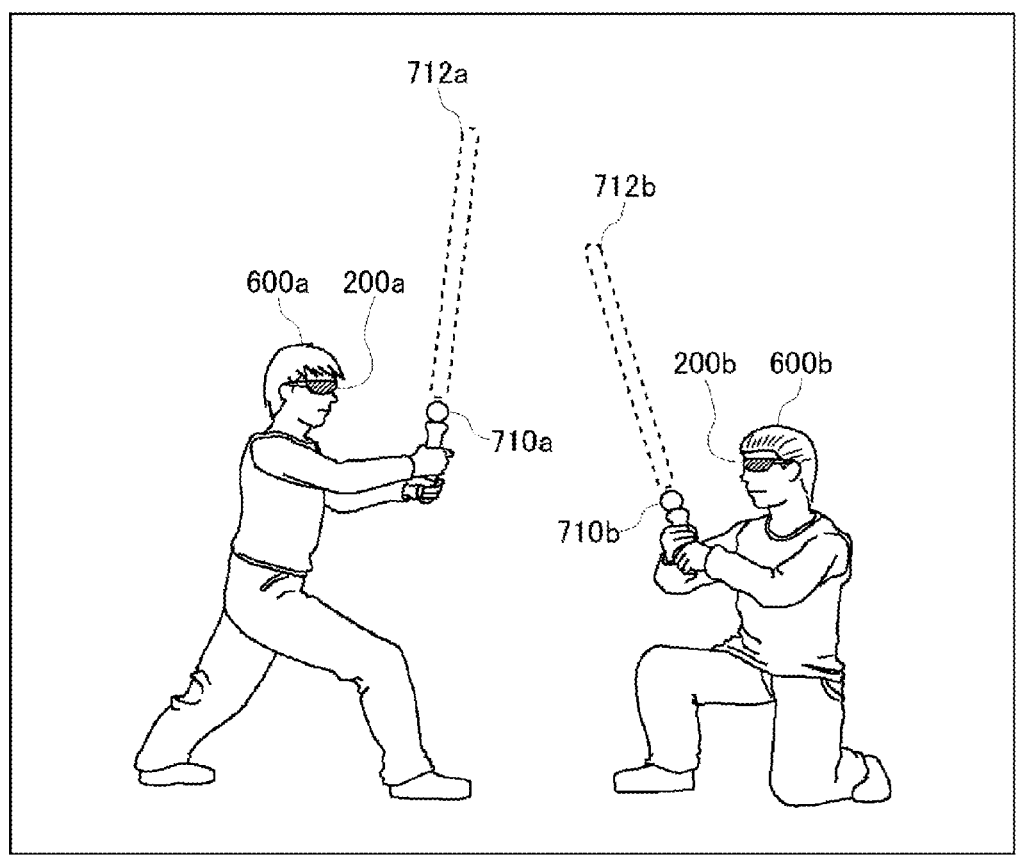
FIG. 7 shows a situation in which two of the stereoscopic image observation devices according to the embodiment are used.

FIG. 7 shows a situation in which two stereoscopic image observation devices 200 according to the embodiment are used. In the example shown in FIG. 7, two users including a first user 600a and a second user 600b are wearing the first stereoscopic image observation device 200a and the second stereoscopic image observation device 200b, respectively. The first user 600a is holding the first marker 710a, and the second user 600b is holding the second marker 710b.

It will be assumed that the marker detection unit 504 detects that the first marker 710a or the second marker 710b is included in the image captured by at least one of the first imaging device 204 provided in the first stereoscopic image observation device 200a and the second imaging device 302 provided in the second stereoscopic image observation device 200b. The image generation unit 506 generates a first AR image 712a showing a sword blade, linking the image to the first marker 710a. Further, the image generation unit 506 generates a second AR image 712b showing a sword blade, linking the image to the second marker 710b. FIG. 7 shows the first user 600a and the second user 600b playing a Chambara game (sword fight game) using virtual sword blades generated in AR images.

In case the game progresses as a plurality of users interact each other as in the case shown in FIG. 7, the user is considered to spend more time watching what other users are doing than watching the marker held by the user. For example, in the example shown in FIG. 7, the first user captures the AR image 712a of the sword blade manipulated by the first user in the field of view of himself or herself, while watching the AR image 712b of the sword blade manipulated by the second user 600b. The first user does not always look at the first marker 710a, which represents the hilt. Meanwhile, the angle of view of the first imaging device 204 provided in the first stereoscopic image observation device 200a worn by the first user 600a includes the second marker 710b held by the second user 600b for a relatively long period of time.

Accordingly, the image generation unit 506 uses, as a marker, the subject captured by at least one of the first imaging device 204 and the second imaging device 302 to generate the AR image presented both on the optical see-through HMD in the first stereoscopic image observation device 200a provided with the first imaging device 204 and on the optical see-through HMD in the second stereoscopic image observation device 200b provided with the second imaging device. As a result, the image generation unit 506 is capable of generating the first AR image 712a presented on the optical see-through HMD worn by the first user 600a, linking the image 712a to the first marker 710a detected by the marker detection unit 504 in the image captured by the second imaging device 302. Further, the first marker 710a generated by the image generation unit 506 is presented both on the optical see-through HMD worn by the first user 600a and on the optical see-through HMD worn by the second user 600b so that the game can progress as the plurality of users interact each other.

Further, even if the first imaging device 204 cannot capture an image of the second marker 710b due to the marker being blocked by the body of the second user 600b, the image generation unit 506 is capable of causing the AR image 712b of the sword blade manipulated by the second user 600b on the optical see-through HMD worn by the first user so long as the second imaging device 302 captures an image of the second marker 710b.

Figure 8:
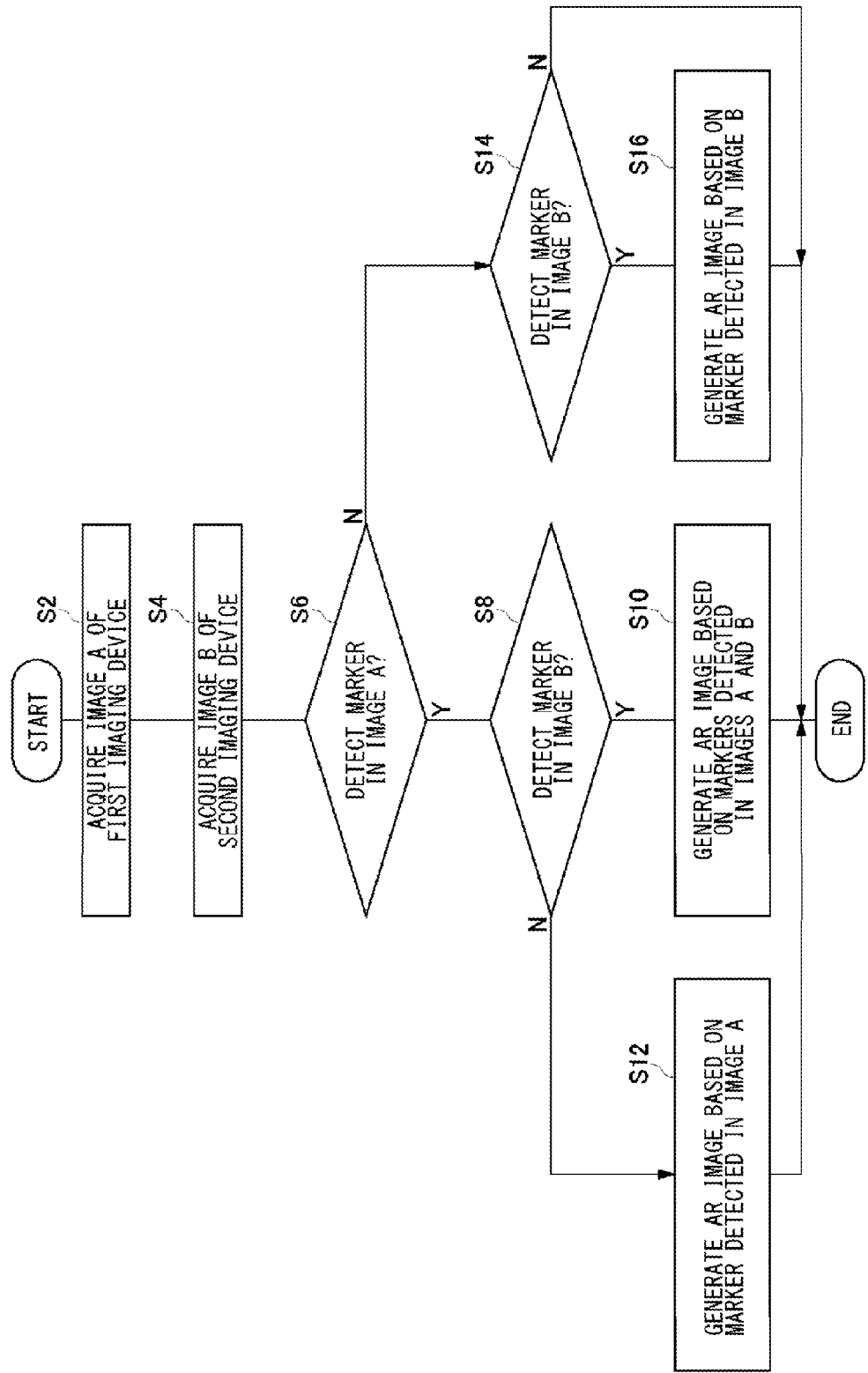
FIG. 8 is a flowchart showing the flow of the image process in the image processing device according to the embodiment.

FIG. 8 is a flowchart showing the flow of the image process in the image processing device 500 according to the embodiment. The process of the flowchart is started when the image processing device 500 is turned on.

The image acquisition unit 502 acquires an image A captured in a follow shot by the first imaging device 204 (S2). The image acquisition unit 502 also acquires an image B captured in a follow shot by the second imaging device 302 (S4).

If the marker detection unit 504 detects the marker in the image A captured in a follow shot by the first imaging device 204 (Y in S6), and if the marker detection unit 504 detects the same marker in the image B captured in a follow shot by the second imaging device 302 (Y in S8), the image generation unit 506 integrates information on the marker detected in the image A and the information on the marker detected in the image B to generate the AR image (S10).

If the marker detection unit 504 detects the marker in the image A captured in a follow shot by the first imaging device 204 (Y in S6), and if the marker detection unit 504 cannot detect the marker in the image B captured in a follow shot by the second imaging device 302 (N in S8), the image generation unit 506 generates the AR image by referring to the marker detected in the image A (S12).

If the marker detection unit 504 cannot detect the marker in the image A captured in a follow shot by the first imaging device 204 (N in S6), and if the marker detection unit 504 detects the marker in the image B captured in a follow shot by the second imaging device 302 (Y in S14), the image generation unit 506 generates the AR image by referring to the marker detected in the image B (S12). If the marker detection unit 504 cannot detect the marker in the image A captured in a follow shot by the first imaging device 204 (N in S6), and if the marker detection unit 504 cannot detect the marker in the image B captured in a follow shot by the second imaging device 302 (N in S14), either, the image generation unit 506 does not perform any particular process.

If the image generation unit 506 generates the AR image or if the marker is not detected in the image A or image B, the process of the flowchart is terminated.

The image processing device 500 having the aforementioned structure is used in situations as described below. Even if the marker is outside the angle of view of the first imaging device 204 provided in the stereoscopic image observation device 200, the marker detection unit 504 is capable of detecting the marker 710 so long as the marker 710 is included in the angle of view of second imaging device 302. The image generation unit 506 presents the AR image generated as being linked to the marker detected by the marker detection unit 504 on the optical see-through HMD in the stereoscopic image observation device 200 worn by the user.

As described above, according to the image processing device 500 of the embodiment, a technology capable of improving the precision of identifying the position of information for which the position is identifiable. More particularly, distinction can be made between whether the user is tilting his or her head, or the marker is tilted, without providing the stereoscopic image observation device 200 with a module for detecting the tilt of a gyro sensor or the like.

Generally, the computational cost to newly detect a marker in an image is far larger than the computational cost to track a marker recognized once. The likelihood of losing sight of the marker is reduced and the computational cost involved in detecting the marker again is prevented from growing, by imaging the marker using a plurality of imaging devices.

Described above is an explanation based on an exemplary embodiment. The embodiment is intended to be illustrative only and it will be obvious to those skilled in the art that various modifications to constituting elements and processes could be developed and that such modifications are also within the scope of the present invention.

(First Variation)

Described above is a case in which the second imaging device 302 is used to capture an image of the marker similarly as the imaging device 204. Instead of, or, in addition to this, the second imaging device 302 may be used to detect the line of sight of the user. More specifically, the second imaging device 302 captures an image of the user's eyes and a line of sight detection unit (not shown) in the image processing device 500 analyzes the direction of line of sight of the user. This can identify the field of view of the user even if the user changes the viewpoint only by moving the eyeballs and without tilting his or her head.

(Second Variation)

The description above primarily concerns a case in which two imaging devices for imaging the marker are provided. The number of imaging devices is non-limiting, and there could be three or more imaging devices. By increasing the number of imaging devices, the likelihood of losing sight of the marker is reduced and the precision of detecting the marker is improved.

What is claimed is:

1. An image processing device comprising:
circuitry configured to:
acquire a first image captured by a first imaging device in an optical head-mounted display (HMD),
wherein the HMD presents a three-dimensional image, and
wherein the first image captured by the first imaging device includes a part of an area including a field of view of a user wearing the HMD;
acquire a second image captured by a second imaging device having an angle of view that at least partially overlaps an angle of view of the first imaging device; and detect a feature of the three-dimensional image based on the first image and the second image.

2. The image processing device of claim 1, wherein the circuitry is configured to detect the feature in the second image if the feature is not detected in the first image.

3. The image processing device of claim 1, wherein the circuitry is configured to generate an augmented real-world image based on the detected feature.

4. The image processing device of claim 3, wherein if the feature is not detected in the first image and the second image, the augmented real-world image is not generated.

5. The image processing device of claim 3, wherein if the feature is detected in the second image but not the first image, the augmented real-world image is generated using the feature detected in the second image.

6. An image processing method comprising:
  acquiring a first image captured by a first imaging device in an optical head-mounted display (HMD),
  wherein the HMD presents a three-dimensional image, and
  wherein the first image captured by the first imaging device includes a part of an area including a field of view of a user wearing the HMD;
  acquiring a second image captured by a second imaging device having an angle of view that at least partially overlaps an angle of view of the first imaging device; and
  detecting a feature of the three-dimensional image based on the first image and the second image.

7. The method of claim 6, wherein the feature is detected in the second image if the feature is not detected in the first image.

8. The method of claim 6, further comprising:
  generating an augmented real-world image based on the detected feature.

* * * * *